(12) United States Patent
Trionfetti

(10) Patent No.: US 10,774,899 B2
(45) Date of Patent: Sep. 15, 2020

(54) DEVICE FOR MOVING AN OBJECT, IN PARTICULAR FOR A BALANCING APPARATUS

(71) Applicant: BALANCE SYSTEMS S.r.L., Milan (IT)

(72) Inventor: Gianni Trionfetti, Agrate Brianza (IT)

(73) Assignee: BALANCE SYSTEMS S.R.L., Milan (IT)

(*) Notice: Subject to any disclaimer, the term of this patent is extended or adjusted under 35 U.S.C. 154(b) by 0 days.

(21) Appl. No.: 16/290,021

(22) Filed: Mar. 1, 2019

(65) Prior Publication Data

US 2019/0271377 A1 Sep. 5, 2019

(30) Foreign Application Priority Data

Mar. 1, 2018 (IT) .................. 102018000003187

(51) Int. Cl.
*F16F 15/32* (2006.01)
*G01M 1/30* (2006.01)
(Continued)

(52) U.S. Cl.
CPC .............. *F16F 15/36* (2013.01); *G01M 1/36* (2013.01); *F16F 2230/0011* (2013.01)

(58) Field of Classification Search
CPC .. F16F 15/20; F16F 15/22; F16F 15/32; F16F 15/36; F16F 2230/0011; B24B 23/028; B24B 41/042; G01M 1/36
See application file for complete search history.

(56) References Cited

U.S. PATENT DOCUMENTS 2,248,523 A * 7/1941 Henri .................. B25D 11/068
173/98
4,117,742 A * 10/1978 Stein ........................ F01D 5/10
368/171
(Continued)

FOREIGN PATENT DOCUMENTS

DE 3943759 C2 10/1996
EP 0124306 B1 * 11/1986 .............. F16F 15/36
(Continued)

OTHER PUBLICATIONS

Italian Search Report for corresponding Italian Application No. 201800003187; five pages, completed Nov. 7, 2018.

*Primary Examiner* — Adam D Rogers
(74) *Attorney, Agent, or Firm* — Vorys, Sater, Seymour and Pease LLP

(57) ABSTRACT

Movement device for moving an object along a movement surface, including: a percussion mass and suspension device, connecting the percussion mass to object, moving to move the percussion mass repeatedly along a closed path, a head, constrained to the object, to interfere with the closed path, the percussion mass interfering with the head along an advance line and direction, connection device for connecting the object to the movement surface to create friction between the object and movement surface. The percussion mass interfering with the head causes a reaction force exceeding the friction, capable of moving the object relative to the movement surface. The percussion mass not interfering with the head along the closed path does not cause reaction forces exceeding the friction, capable of moving the object relative to the movement surface.

17 Claims, 1 Drawing Sheet

(51) Int. Cl.
  *F16F 15/36* (2006.01)
  *G01M 1/36* (2006.01)

(56) References Cited

U.S. PATENT DOCUMENTS

| | | | | |
|---|---|---|---|---|
| 5,813,253 | A | * | 9/1998 | Uhlin .................... D06F 37/225 |
| | | | | 210/144 |
| 7,284,460 | B2 | * | 10/2007 | Yamamoto .............. B23B 31/00 |
| | | | | 279/103 |
| 7,882,512 | B2 | * | 2/2011 | Hanai ..................... F16F 15/36 |
| | | | | 720/600 |
| 10,344,417 | B2 | * | 7/2019 | Kim ....................... D06F 37/225 |
| 2006/0005623 | A1 | * | 1/2006 | Hildebrand ......... F16F 15/1414 |
| | | | | 73/468 |
| 2006/0178780 | A1 | | 8/2006 | Justak et al. |

FOREIGN PATENT DOCUMENTS

| | | | | |
|---|---|---|---|---|
| EP | 2717032 | A1 | * 4/2014 | ........... B24B 41/042 |
| GB | 1430873 | A | * 4/1976 | ............. F16F 15/265 |
| SU | 1632143 | A1 | 10/1991 | |

\* cited by examiner

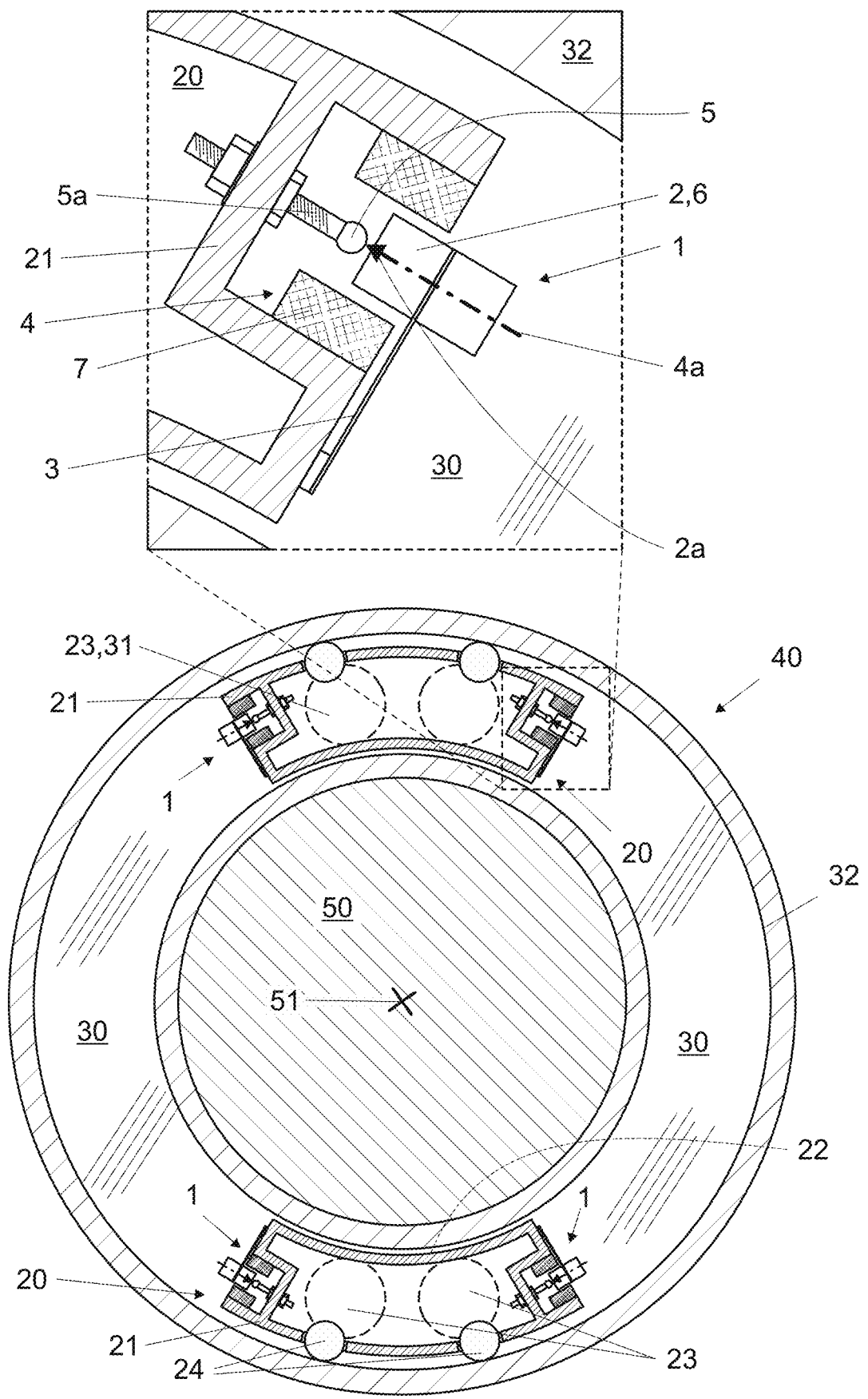

DEVICE FOR MOVING AN OBJECT, IN PARTICULAR FOR A BALANCING APPARATUS

FIELD OF THE INVENTION

The present invention relates to a device for moving an object along a movement surface.

In particular, the movement device according to the invention is adapted to move masses in a balancing system.

DESCRIPTION OF THE PRIOR ART

Different means, motors and devices are currently known for moving objects and systems in general.

Electric motors with wheels, for example, or other sliding systems are known.

Magnetic means, combustion engines and many other systems are known.

For example, in the specific field of balancing systems or apparatus, various types of moving means exist.

Balancing apparatuses are systems adapted to balance an element rotating about a rotation axis, for example, the rotating member of a tool or similar.

Said balancing apparatuses generally comprise two movable masses, which rotate together with the rotating element to be balanced, about the rotation axis of the latter.

Balancing apparatuses also comprise means for measuring the imbalance of the member rotating about the rotation axis, which are adapted to constantly assess whether the rotating member is balanced on rotation, i.e. whether the centre of mass thereof lies along the rotation axis.

Balancing apparatuses are described in patent applications SU-A-1632143 and DE-A-3943759.

Despite being integral with the rotating member most of the time, the movable masses are also movable with respect to the latter, rotating about the stated rotation axis. When the two masses are opposed at 180° about the rotation axis, they create no imbalance to the rotating member, however, when they are in different reciprocal positions, they create an imbalance to the rotating body. Said imbalance is used to recreate the balance of the rotating member. Thus, the movable masses are activated when the means for measuring the imbalance determine an imbalance.

The movable masses are generally moved with respect to the system of reference formed by the rotating member in rotation by means of electric motors arranged along the rotation axis of the rotating member and connected to the masses by means of gears and similar connections.

A similar balancing system is described in patent application EP 2717032 A, by the same applicant.

The balancing apparatuses described have some important drawbacks.

In fact, in some cases, the portion of the central axis of the rotating member is occupied by other objects and devices, and the motors are thus unable to be positioned there.

However, the electric motors cannot be positioned in positions different from the rotation axis. In fact, the apparatuses, which must be balanced, frequently reach highly elevated rotation speeds, in the order of magnitude of tens of thousands, or even hundreds of thousands of revs per minute.

Consequently, the electric motors, which are not positioned along the axis, are subjected to centrifugal accelerations, which are too elevated and can cause the breakage thereof.

Patent application US 2006/0005623 A, attempts to overcome said drawback by using magnetic moving devices. Such systems comprise movable masses formed by permanent magnets and movement systems for the latter, always with respect to the system of reference formed by the rotating member in rotation, formed by fixed magnets external to the rotating member and adapted to accelerate or decelerate the masses so as to move them with respect to the rotating member.

Such balancing apparatus is in a ring and leaves the central portion of the rotating member free.

However, the described balancing apparatus is relatively imprecise, since the movable masses can only be arranged in predetermined positions.

Furthermore, the magnetic means frequently pick up scraps of metal from processing, which tends to block the movement of the system, making maintenance more difficult.

Finally, said balancing apparatus is highly complex and costly.

Patent EP 0124306 B, describes a device, which attempts to overcome said drawback by using compensation masses, which can be created by filling or emptying liquid containers.

Thus, such device does not comprise motors, but simply nozzles for ejecting fluid under pressure, which, on request, fills chambers with circular sectors coaxial to the rotation axis, which create the compensation masses for the imbalance. The fluid remains in the chambers due to the centrifugal force and, in the event of the rotating member stopping, is emptied by gravity.

Thus, due to the emptying with each stop, for example, of the spindle, said system is highly complex and a rebalancing is needed after every reboot.

Furthermore, coolant is present inside the grinding machines and sometimes it randomly enters the chambers, causing temporary imbalances of the rotating member, which requires further balancing cycles.

SUMMARY OF THE INVENTION

In this context, the technical task underlying the present invention is to devise a movement device for an object capable of substantially overcoming at least some of the stated drawbacks.

Within the scope of said technical task, one important object of the invention is to provide a device for moving an object, which is both robust and resistant to elevated stress and accelerations.

Another important object of the invention is to provide a simple and cost-effective movement device.

Last but not least, it is an object of the invention to provide a movement device, which is adapted to move the compensation masses in a balancing apparatus.

The technical task and the specified objects are achieved with a device for moving an object along a movement surface, comprising: a percussion mass and suspension means, constraining the percussion mass to the object, moving means adapted to move the percussion mass repeatedly along a closed path and constrained to the object, a head, constrained to the object, adapted to interfere with the closed path, the percussion mass interfering with the head along an advance line and direction, connection means for connecting the object to the movement surface adapted to create friction between the object and the movement surface, when the percussion mass interferes with the head, it causes a reaction force exceeding the friction, which is capable of moving the object with respect to the movement surface, when the percussion mass does not interfere with the head along the closed path, it causes no reaction forces exceeding the friction, which are capable of moving the object with respect to the movement surface.

BRIEF DESCRIPTION OF THE DRAWINGS

The features and advantages of the invention will be apparent from the detailed description of preferred embodiments thereof, with reference to the accompanying drawings, wherein:

FIG. 1 shows a section with an enlargement of the system including a device according to the invention.

DESCRIPTION OF THE PREFERRED EMBODIMENTS

Herein, the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measurement, shape or geometric reference with which it is associated. For example, such terms, if associated with a value, preferably indicate a divergence of no more than 10% from said value.

Furthermore, when used, terms such as "first", "second", "higher", "lower", "main" and "secondary" do not necessarily identify an order, a priority relationship or a relative position, but can simply be used to distinguish the different components more clearly from one another.

Unless otherwise indicated, the measurements and data reported in this document are to be considered using International Standard Atmosphere ICAO (ISO 2533:1975).

With reference to the FIGURES, numeral reference 1 globally denotes the movement device according to the invention.

It is adapted to move an object 20 along a movement surface 30. Thus, the object 20 comprises at least one movement device 1 and also, preferably, at least one substantially rigid frame 21. Thus, the frame 21 is at least one portion of the object 20, which can be defined as substantially rigid, so, for example, made of metal or resistant polymers or having sizes, which make them resistant or more.

The invention further relates to a variable configuration apparatus 40 comprising the movement surface 30 and at least one movable object 20.

In brief the movement device 1 comprises a percussion mass 2 and suspension means 3, which constrain the percussion mass 2 to the object 20. Thus, the suspension means are constrained to both the object 20 and the suspension mass 2.

The percussion mass 2 is preferably prevalently made of metal, more preferably prevalently made of steel.

The movement device 1 further comprises moving means 4 adapted to move the percussion mass 2 repeatedly along a closed path 4a, preferably constrained to the object 20.

Preferably, the moving means 4 are of the magnetic type and preferably comprise a permanent magnet 6 and a solenoid 7.

Preferably, the permanent magnet 6 is further constrained, more preferably it is integrally constrained to the percussion mass 2 and forms at least part of the same mass and preferably the substantial totality of the percussion mass 2.

Preferably, the solenoid 7 is arranged about at least part of the percussion mass 2.

It is further supplied electrically, preferably by alternate current, so as to create a varying magnetic field, adapted to move the permanent magnet 6 of alternate movement.

Thus, the movement device 1 preferably comprises supply means, preferably electric for the solenoid 7. They can be on board the object 20 or outside the same and connected to the latter by means of a cabled or wireless electric connection, for example, by electro-magnetic induction.

The suspension means 3, which connect the percussion mass 2 to the object 20, and preferably to the frame 21, are preferably formed by an elastic element, for example, a leaf-spring, or a magnetic suspension. The suspension means 3 preferably further define a closed path 4a formed by a line traveled alternately in opposite directions. Said line is preferably a circumferential arc or a segment of straight line or other. Thus, the suspension means 3 are preferably a leaf-spring, preferably constrained at one end to the object 20 and, more specifically, to the frame 21 and, at the opposite end, to the percussion mass 2.

Preferably, the movement device 1 further comprises a head 5, constrained to the object 20, and adapted to interfere with the closed path 4a, thus preferably arranged along the route of the percussion mass 2.

In the example of the linear movement of the percussion mass 2, the head 5 defines one end of the closed path 4a. It is also preferably perpendicular to the closed path 4a in the point of contact. Various heads 5 can also be present, although preferably not opposite and preferably there is only one head.

Preferably, the head 5 is also constrained integrally to the frame 21 of the object 20.

The position of the head 5, with respect to the closed path, is also preferably adjustable. For example, the head 5 can be placed on the end of a threaded bar 5a, which is screwable to the frame 21 and moved towards or moved away from the percussion mass 2 in a rest position. The head 5 is preferably a spherical surface, at least at the portion struck by the percussion mass 2. Finally, it is preferably made of steel or similar.

The interference of the percussion mass 2 and head 5 occurs along a direction and advance line 2a.

The movement device 1 further comprises connection means 23 for connecting the object 20 to the movement surface 30, which are suitable to create friction between the object 20 and the movement surface 30.

The connection means 23 consequently comprise, the support surface 22 for the object 20 and the movement surface 30.

The connection means 23 can also not comprise other elements and exploit the gravitational force, and additional counterweights or masses, to generate said friction.

Alternatively, the connection means 23 comprise elastic thrust means, adapted to press the object 20 against said movement surface 30. The connection means 23, particularly in this last case, can be adjustable, for example, by means of adjusting the compression of a spring forming the elastic thrust means, which acts by pressing the support surface 22 against the movement surface 30.

Additionally or exclusively, the connection means 23 can also comprise magnetic means 31 adapted to press the support surface 22 of the object 20 against the movement surface 30.

Preferably, the movement surface 30 defines a linear path, which preferably extends in the advance direction 2a. In particular, the path can be circular or similar. Preferably, the path extends exclusively along a linear trajectory, for example, circular or rectilinear or other.

Preferably, the object 20 further comprises a plurality of movement devices 1, each adapted to move the object 20 in different directions and advance lines 2a.

The movement devices 1 comprised in an object 20 are more preferably two in number, defining the same advance direction 2a and opposite lines. Thus, said movement devices 1 are adapted to move in one direction or the opposite one along the linear trajectory defined by the movement surface 30.

Furthermore, the connection means 23, the moving means 4, the percussion mass 2 and the other elements are selected or regulated in such a way that, when the percussion mass 2 interferes with the head 5 it causes a reaction force adapted to move the object 20, and preferably the frame 21, with respect to the movement surface 30 exceeding the friction present between the object 20 and the surface 30. In fact, when the percussion mass 2 interferes with the head 5, the interaction of the two objects causes an impulsive force given by the sudden braking of the percussion mass 2, which knocks against the head 5 and also rebounds in the opposite direction. In fact, the sudden braking is nothing but a highly elevated acceleration in the opposite direction.

The high acceleration of the percussion mass 2 causes a directly proportionate force, which, due to the principle of conservation of the centre of mass, generates an equal and opposing force, which moves the object 20. Said force exceeds the threshold of static friction between the movement surface 30 and the object 20. In fact, as known, a body subjected to a force and a friction, with optimal approximation, only moves if a threshold of static friction is exceeded. Once the movement has started, dynamic friction, which is lower than the static friction, comes into play. Consequently, the object 20 moves in an advance line and direction 2a of a displacement of an entity directly proportionate to the acceleration and mass of the percussion mass 2 and inversely proportionate to the mass thereof. Clearly, the object 20 moves with the components connected and constrained thereto, such as the percussion mass 2 and the moving means 4.

Furthermore, the connection means 23, the moving means 4, the percussion mass 2 and the other elements are selected or regulated in such a way that, when the percussion mass 2 does not interfere with the head 5 along the closed path 4a, reaction forces are not caused, which are capable of moving the object 20 with respect to the movement surface 30 exceeding said friction.

For example, the end-stop of the path 4a on the opposite side of the head 5, for example, given by the elastic end-stop of the spring, which creates the suspension means 3, causes a return acceleration, which is not sufficient to exceed the threshold of static friction.

Consequently, the object 20 does not move in directions and lines different from the advance line and direction 2a.

Said asymmetry causes an advancing of the object 20 in an advance line and direction 2a with every round of the path 4a. By regulating the number or frequency of travel of the path 4a the advancing and speed of the object 20 are consequently regulated.

Said elements, such as the connection means 23, the moving means 4, the percussion mass 2 and the others, can easily be selected by a person skilled in the art. In particular, if the percussion mass 2 and the head 5 are made of the stated materials, which are highly elastic and resistant and maximize said impulsive braking force. The percussion mass 2, for example, is preferably from $1/100$ to $1/5$ of the mass of the object 20. The selection is simple also because the elastic return impulsive force, caused by the interaction of the percussion mass 2 against the head 5, is generally one or more orders of magnitude greater than the reaction force, which occurs without impacts. Consequently, it is very easy for the object 20 to be moved only at said impacts.

Preferably, the object 20 further comprises a plurality of movement devices 1, each adapted to move a mass 20 in a different direction and advance line 2a. Preferably, the devices are two in number and act along the same direction and in opposite lines. The movement devices 1 can preferably be activated one at a time on command, determining the advancing of the object 20 in an advance line and direction 2a at a determined speed and of a determined entity.

The variable configuration apparatus 40 is advantageously and preferably part of a balancing apparatus of a rotating member 50 rotatable about a rotation axis 51. The balancing apparatus is preferably used for rotors 50 of tools, in particular for grinders, more specifically for grinding wheels.

The balancing apparatus comprises balancing masses, preferably a plurality, more preferably two in number, rotatable with the rotating member 50 and also movable with respect to the same to compensate any imbalances.

The movement device 1 is ideal for moving balancing masses. Thus, each object 20 preferably constitutes a balancing mass adapted to balance imbalances of the rotating member 50 in rotation with respect to the axis 51.

In this case, the movement surface 30 is constrainable, preferably integrally, to the rotating member 50, it is substantially annular with the axis coinciding with the rotation axis 51. Thus, it defines a circular trajectory with the axis coinciding with the rotation axis 51.

Thus, the balancing masses are formed by objects 20 each preferably substantially defining a circular sector with the axis coinciding with the rotation axis 51.

The movement devices 1 are preferably made as previously described and there are two in number per object 20, they define opposite directions in order to move said object 20 clockwise or anti-clockwise with a rotatory motion about the rotation axis 51, or in an advancing or backward motion along the annular path formed by the movement surface 30.

The suspension means 3 are preferably leaf-springs extending prevalently in a radial direction, and the percussion masses 2 also preferably have a centre of mass lying along the leaf-spring, so that the centrifugal force acts along the axis of the leaf-spring without deforming it.

The connection means 23 illustrated in FIG. 1 are preferably magnetic means, while the surface 30 is preferably made of ground steel and the surface 22 can be made of polymeric material, such as PTFE, PE or similar.

The object 2, which constitutes the balancing mass, also preferably comprises low friction members 24, preferably roller bearings, which regulate the interaction between the outer ring 32 or upper part, which limits the surface 23 externally and the upper surface of the object 20. In fact, when the tool reaches elevated velocities, the force of interaction between these two surfaces is very high, also close to the ton, and the low friction members are necessary to prevent the friction formed from completely blocking the movement of the objects 20 with respect to the rotating member 50.

Finally, the balancing apparatus comprises other devices and means, known in themselves, such as imbalance sensors, usually formed by a vibration sensor, control means and other.

Similar balancing apparatuses and the operation thereof are described, for example, in the patent documents: EP 2717032 A, from paragraph 22 to paragraph 62 and in FIGS. 1-4 or EP 0409050 B1, from col. 3 line 20 to col. 5 line 46 and in FIGS. 1-4. The only difference in this balancing apparatus, from the stated patent documents, is that the latter move the balancing masses by means of electric motors arranged along the axis of the rotating member, while in this case the same are moved by the movement devices 1 described in this text.

The invention comprises a new method for moving an object 20 along a movement surface 30 by means of a movement device 1. Such method is preferably implemented with the physical elements and concrete or functional parameters described previously.

Said movement method comprises the steps of:
moving the percussion mass 2 repeatedly along the closed path 4a, preferably as described previously,
percussing the percussion mass 2 against the head 5 along the advance line and direction 2a, causing a reaction force exceeding said friction, which is capable of moving the object 20 with respect to the movement surface 30, preferably as described previously,
moving the percussion mass 2 along the closed path 4a, excluding the percussion, also causing no reaction forces exceeding said friction, which are capable of moving the object 20 with respect to the movement surface 30, preferably as described previously.

Said method also preferably constitutes a balancing method for a rotating member.

The movement device 1 and also the balancing apparatus according to the invention achieve important advantages.

In fact, the movement device 1 is made up of few pieces and is robust and resistant to elevated stress and accelerations. Thus, it is simple and cost-effective.

Furthermore, the movement device 1 is ideal for moving the compensation masses in a balancing apparatus. In fact, it easily resists highly elevated centrifugal accelerations and does not require an external rotary engine, but simply a source of electricity, which can be inside the mass or object 20 or connected from an external network by means of electromagnetic induction or similar.

The described balancing apparatus further allows a ring structure to be obtained, which leaves the axial portion of the same device free.

The invention is subject to variations falling within the scope of the inventive concept as defined in the claims. In this context, all of the details can be replaced by equivalent elements, and any materials, shapes and dimensions can be used.

The invention claimed is:

1. A movement device for moving an object along a movement surface, comprising:
a percussion mass and suspension means, constraining said percussion mass to said object,
moving means adapted to move said percussion mass repeatedly along a closed path and constrained to said object,
a head, constrained to said object, adapted to interfere with said closed path,
said percussion mass interfering with said head along an advance line and direction,
connection means for connecting said object to said movement surface adapted to create friction between said object and said movement surface,
when said percussion mass interferes with said head, said percussion mass causes a reaction force exceeding said friction, which is capable of moving said object with respect to said movement surface,
when said percussion mass does not interfere with said head along said closed path, said percussion mass causes no reaction forces exceeding said friction, which are capable of moving said object with respect to said movement surface, wherein said suspension means are formed by an elastic element and said closed path is formed by a line traveled alternately in opposite directions.

2. The movement device according to claim 1, wherein said moving means comprise a permanent magnet and a solenoid.

3. The movement device according to claim 2, wherein said permanent magnet is integrally constrained to said percussion mass.

4. The movement device according to claim 1, wherein said object comprises a rigid frame and wherein said head is integrally constrained to said rigid frame.

5. The movement device according to claim 1, wherein said connection means comprise a support surface for supporting said object, the movement surface and gravitational force.

6. The movement device according to claim 1, wherein said connection means comprise magnetic means adapted to press said object against said movement surface.

7. A variable configuration apparatus comprising said movement surface and at least one of said movablo object, said object comprising at least one said movement device according to claim 1.

8. The variable configuration apparatus according to claim 7, comprising a plurality of said movement devices, each adapted to move said object along different advance lines and directions.

9. A balancing apparatus for a rotating member comprising a variable configuration apparatus according to claim 8, said rotating member being rotatable about a rotation axis, wherein said movement surface is arranged integrally with said rotating member and is substantially annular, with an axis of the movement surface coinciding with said rotation axis, wherein said at least one object constitutes at least one balancing mass adapted to balance imbalances of said rotating member in rotation with respect to said rotation axis.

10. The balancing apparatus according to claim 9, wherein there are two said balancing masses and each balancing mass comprises two of said movement devices adapted to move each of said balancing masses in opposite directions and in a direction of rotation about said rotation axis along said substantially annular movement surface.

11. A movement device for moving an object along a movement surface, comprising:
a percussion mass and suspension means, constraining said percussion mass to said object,
moving means adapted to move said percussion mass repeatedly along a closed path and constrained to said object,
a head, constrained to said object, adapted to interfere with said closed path,
said percussion mass interfering with said head along an advance line and direction,
connection means for connecting said object to said movement surface adapted to create friction between said object and said movement surface,
when said percussion mass interferes with said head, said percussion mass causes a reaction force exceeding said friction, which is capable of moving said object with respect to said movement surface, when said percussion mass does not interfere with said head along said closed path, said percussion mass causes no reaction forces exceeding said friction, which are capable of moving said object with respect to said movement surface, wherein said connection means comprise magnetic means adapted to press said object against said movement surface.

12. The movement device according to claim 11, wherein said moving means comprise a permanent magnet and a solenoid.

13. The movement device according to claim 12, wherein said permanent magnet is integrally constrained to said percussion mass.

14. A balancing apparatus for a rotating member comprising:
a variable configuration apparatus comprising a movement surface and at least one movable object, said object comprising a plurality of movement devices for moving said object along said movement surface,
each of the plurality of movement devices is comprised of:
a percussion mass and suspension means, constraining said percussion mass to said object,
moving means adapted to move said percussion mass repeatedly along a closed path and constrained to said object,
a head, constrained to said object, adapted to interfere with said closed path,
said percussion mass interfering with said head along an advance line and direction,
connection means for connecting said object to said movement surface adapted to create friction between said object and said movement surface,
when said percussion mass interferes with said head, said percussion mass causes a reaction force exceeding said friction, which is capable of moving said object with respect to said movement surface,
when said percussion mass does not interfere with said head along said closed path, said percussion mass causes no reaction forces exceeding said friction, which are capable of moving said object with respect to said movement surface,
said movement devices being each adapted to move said object along different advance lines and directions,
said rotating member being rotatable about a rotation axis, wherein said movement surface is arranged integrally with said rotating member and is substantially annular, with an axis of the movement surface coinciding with said rotation axis, wherein said object constitutes a balancing mass adapted to balance imbalances of said rotating member in rotation with respect to said rotation axis.

15. The balancing apparatus according to claim 14, wherein said connection means comprise magnetic means adapted to press said object against said movement surface.

16. The balancing apparatus according to claim 14, wherein said moving means comprise a permanent magnet and a solenoid.

17. The balancing apparatus according to claim 14, wherein said permanent magnet is integrally constrained to said percussion mass.

* * * * *

UNITED STATES PATENT AND TRADEMARK OFFICE
CERTIFICATE OF CORRECTION

PATENT NO. : 10,774,899 B2  
APPLICATION NO. : 16/290021  
DATED : September 15, 2020  
INVENTOR(S) : Gianni Trionfetti Page 1 of 1

It is certified that error appears in the above-identified patent and that said Letters Patent is hereby corrected as shown below:

In the Claims

Claim 7, Column 8, Line 28, should read as follows:
movement surface and at least one of said object, Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*